L. J. HOLCOMB.
Potato-Planter.
No. 55,657.
Patented June 19, 1866.
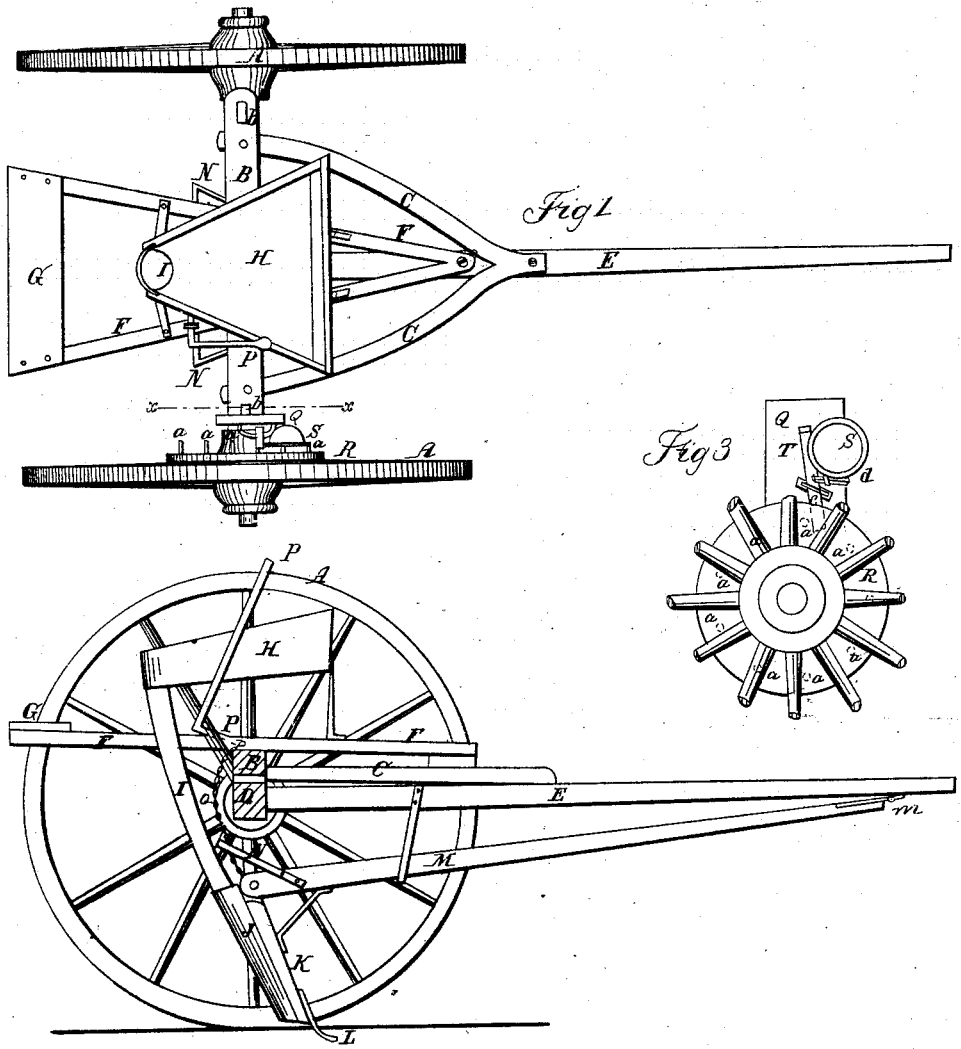
Witnesses
Jno. H. Henkel
E. W. Hill
Inventor
Lyman J. Holcomb
by Coburn Mann
attorney

UNITED STATES PATENT OFFICE.

LYMAN J. HOLCOMB, OF NUNDA, ILLINOIS.

IMPROVEMENT IN POTATO-PLANTERS.

Specification forming part of Letters Patent No. 55,657, dated June 19, 1866.

*To all whom it may concern:*

Be it known that I, LYMAN J. HOLCOMB, of Nunda, in the county of McHenry and State of Illinois, have invented a new and useful Improvement in Potato-Planters; and I do hereby declare that the following is a full, clear, and exact description of the same, reference being had to the accompanying drawings, and the letters and figures marked thereon, which form part of this specification.

My invention consists in a cheap, simple, and novel arrangement, which is removably attached upon the rear axle and wheels of an ordinary two-horse farm-wagon, whereby potatoes may be readily dropped at suitable intervals in a trench made for that purpose by a shovel, suitably arranged, by a person who rides upon the machine, thus greatly facilitating the operation of planting.

To enable those skilled in the art to understand how to construct and use my said invention, I will proceed to describe the same with particularity, making reference, in so doing, to the aforesaid drawings, in which—

Figure 1 represents a plan or top view of my invention. Fig. 2 is a side elevation thereof in section at $x$ in Fig. 1, and Fig. 3 is a detached view of the signal device, hereinafter described.

Similar letters of reference in the several figures indicate the same parts of my invention.

A represents the rear wheels, and D the rear axle, of a farm-wagon, B representing the bolster upon which the box, when in use, rests, between the stakes $b\ b$.

C represents the ordinary hounds or braces upon the reach connecting the front and rear wheels.

E represents the draft-pole of the potato-planter, which is substituted in place of the reach, the hounds C being secured thereto by removable bolts or in any suitable manner.

F represents a V-shaped frame, secured upon the draft-pole E and resting upon the bolster B, a seat, G, being arranged upon their rear ends, as shown, upon which the operator sits.

H represents a hopper, in which the potatoes are placed, which is supported upon the frame F in any suitable manner. The said frame F is secured upon the bolster by screws or in any other mode.

I represents a flexible tube of suitable size opening into the said hopper and having its lower end arranged within a tube or passage, J, which is attached to the standard of the plow or shovel L, (marked K.) The said standard K is pivoted, as shown, to the rear end of the beam M, which is hinged at its front end to the pole E, so as to have a vertical motion at its rear end, which is raised, when desired, by means of the chain O and lever P, said tube J sliding upon the tube I in such case.

Q represents a plate, of wood or other proper material, which is removably attached to one of the stakes $b$, as shown, upon which is fixed a bell, (marked S.)

The iron bar or lever T is pivoted at $c$, and the upper end thereof is kept in contact with the bell by means of a spring, $d$.

Upon the wheel adjacent is fixed a removable circular plate, (marked R,) provided with a series of pins, $a$, which strike successively upon the lower end of the lever T as the wheel revolves and moves the upper end away from the bell, so that when released the spring $d$ strikes the bar or lever upon the bell and gives the signal for the operator to drop the potatoes for each hill, the distance of the pins $a$ apart being such as to cause the bell to sound when the proper distance between the hills has been passed over by the machine. Thus the operator sits upon the seat, and, resting his feet upon the supports N, attached to the rear end of the beam M, drops the potatoes into the spout I as each blow is given to the bell.

The operating parts of the planter are readily removed from the wagon-wheels when the planting is finished.

I claim as my invention and desire to secure by Letters Patent—

1. The combination of the pole E, frame F, seat G, hopper H, tube I, beam M, and plow L, arranged and operating as and for the purposes specified.

2. In combination with the above and the wheels A and axle B of a wagon, the circular plate R, pins $a$, bell S, lever T, and spring $d$, arranged and operating substantially as and for the purposes set forth.

LYMAN J. HOLCOMB.

Witnesses:
 W. E. MARRS,
 JNO. W. HERTHEL.